United States Patent [19]

Kaziwara

[11] Patent Number: 5,533,092
[45] Date of Patent: Jul. 2, 1996

[54] ORDER WIRE IN TELEPHONE COMMUNICATION SYSTEM

[75] Inventor: Shinzi Kaziwara, Kawasaki, Japan

[73] Assignee: Fujitsu Limited, Japan

[21] Appl. No.: 18,824

[22] Filed: Feb. 18, 1993

[30] Foreign Application Priority Data

Feb. 24, 1992 [JP] Japan .................................. 4-035502

[51] Int. Cl.⁶ .......................... H04M 1/24; H04M 3/08; H04M 3/22
[52] U.S. Cl. .................................. 379/21; 379/1; 379/7; 379/8; 379/12; 379/35
[58] Field of Search ................... 379/1, 7, 8, 12, 379/21, 35

[56] References Cited

U.S. PATENT DOCUMENTS

| | | | |
|---|---|---|---|
| 4,029,913 | 6/1977 | Gunderson | 379/12 |
| 4,159,402 | 6/1979 | De Graauw | 379/12 |
| 4,611,100 | 9/1986 | Schembri | 379/8 |
| 4,760,592 | 7/1988 | Hensley | 379/7 |
| 4,837,811 | 6/1989 | Butler | 379/21 |
| 5,063,563 | 11/1991 | Ikeda et al. | 379/1 |
| 5,157,708 | 10/1992 | Garthwaite | 379/21 |
| 5,166,970 | 11/1992 | Ward | 379/21 |
| 5,195,124 | 3/1993 | Ishioka | 379/8 |
| 5,228,072 | 7/1993 | Ingalsbe | 379/21 |
| 5,323,449 | 6/1994 | Mori | 379/100 |

*Primary Examiner*—Stephen Chin
*Assistant Examiner*—Vijay Shankar
*Attorney, Agent, or Firm*—Greer, Burns & Crain, Ltd.

[57] ABSTRACT

A switchable order wire circuit installed in addition to a trunk connecting a master station which includes an exchanger and a dependent station in a telephone system. The order wire circuit includes a first telephone terminal located in the master station, a second telephone terminal located in the dependent station, and a pair of telephone lines connecting the first and second telephone terminals. The order wire circuit also includes a hooking detection system installed in the master station, for detecting a hooking operation of the second telephone terminal. In addition, a circuit for switching the telephone lines from the first telephone terminal to a public line when the hooking operation is specifically detected is included. The hooking operation is generally specified by an on-hook state of the second telephone terminal after a first off-hook state is determined to be shorter than a first predetermined period and the first predetermined period terminates within a second predetermined period measured after the first off-hook operation of the second telephone terminal.

3 Claims, 3 Drawing Sheets

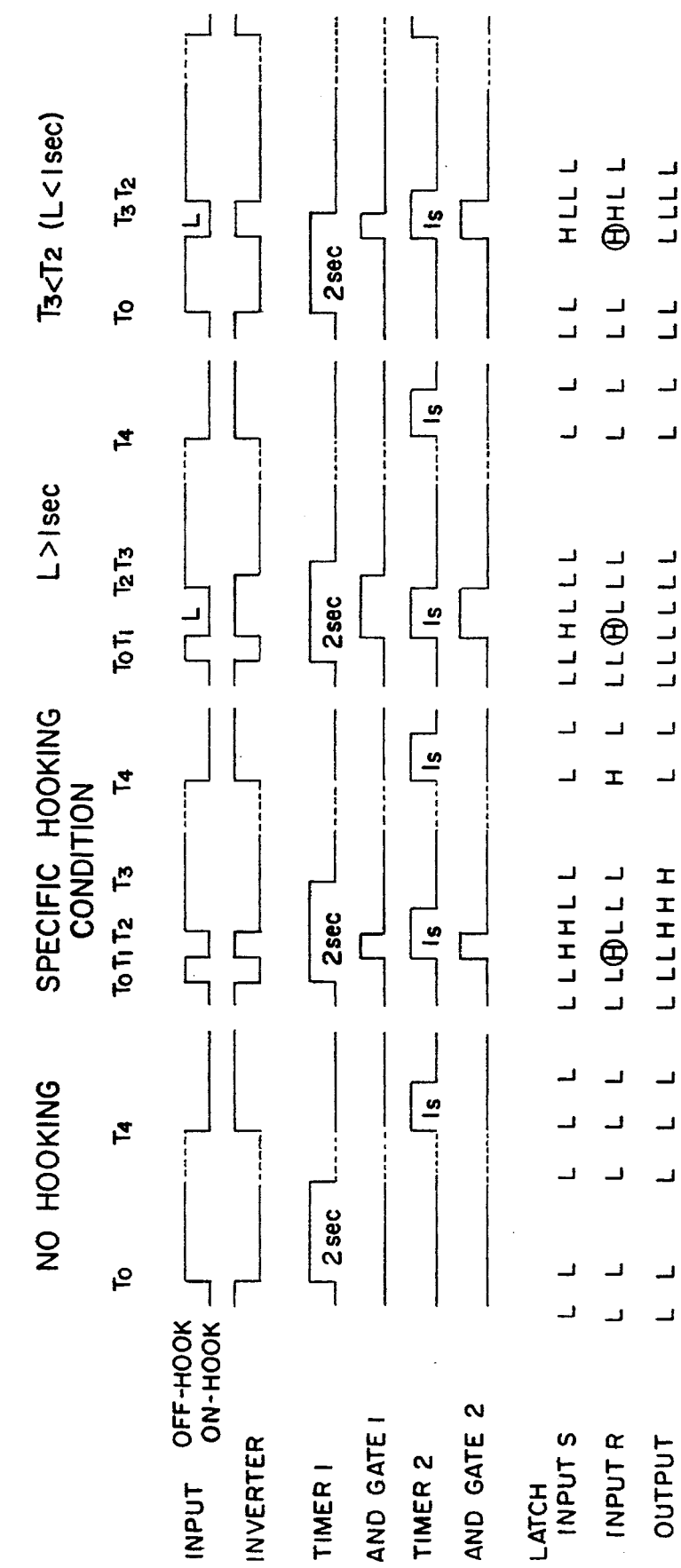

ORDER WIRE IN TELEPHONE COMMUNICATION SYSTEM

BACKGROUND OF THE INVENTION

1. Field of the invention

This invention relates to an order wire switchable to a public line, used in a telephone communication system.

2. Description of the Related Arts

An order wire which is an auxiliary circuit for use in the line-up and maintenance of telephone communication facilities has been employed in parallel to telephone trunk connecting between a repeater station and a switching station or another repeater station.

Thus, the order wire is isolated from the telephone system. An Engineer at the repeater station may require to speak to a person outside the station opposite across the order wire. Then, the Engineer must ask, via the order wire a person in the opposite station to convey his message to the outside person, or the Engineer must go out of the repeater station to look for a public telephone. However, the repeater station is often located in a rural area where no public telephone service is accessible available.

SUMMARY OF THE INVENTION

It is a general object of the invention to provide an order wire which allows an easy connection from a repeater station to a public line.

An order wire circuit, installed in addition to a trunk connecting a master station having an exchanger and a dependent station in a telephone system, comprises a first telephone terminal located in the master station; a second telephone terminal located in the dependent station; a telephone line connecting the first and second telephone terminals; hooking detection means installed in the master station, for detecting an on hook/off hook operation of the second telephone terminal; switching means for switching the telephone lines from the first telephone terminal to a public line when the on hook/off hook operation is specifically detected. The hooking operation is generally determined by a first predetermined period of on-hook state of the second telephone terminal within a predetermined second period after a first off-hook operation of the second telephone terminal.

The above-mentioned features and advantages of the present invention, together with other objects and advantages, which will become apparent, will be more fully described hereinafter, with references being made to the accompanying drawings which form a part hereof, wherein like numerals refer to like parts throughout.

A BRIEF DESCRIPTION OF THE DRAWINGS

FIG. 1 schematically illustrates a preferred embodiment of the present invention;

FIGS. 4(a)–4(d) illustrate timing charts at the hooking operation discrimination circuit.

DESCRIPTION OF THE PREFERRED EMBODIMENT

Figure 1:
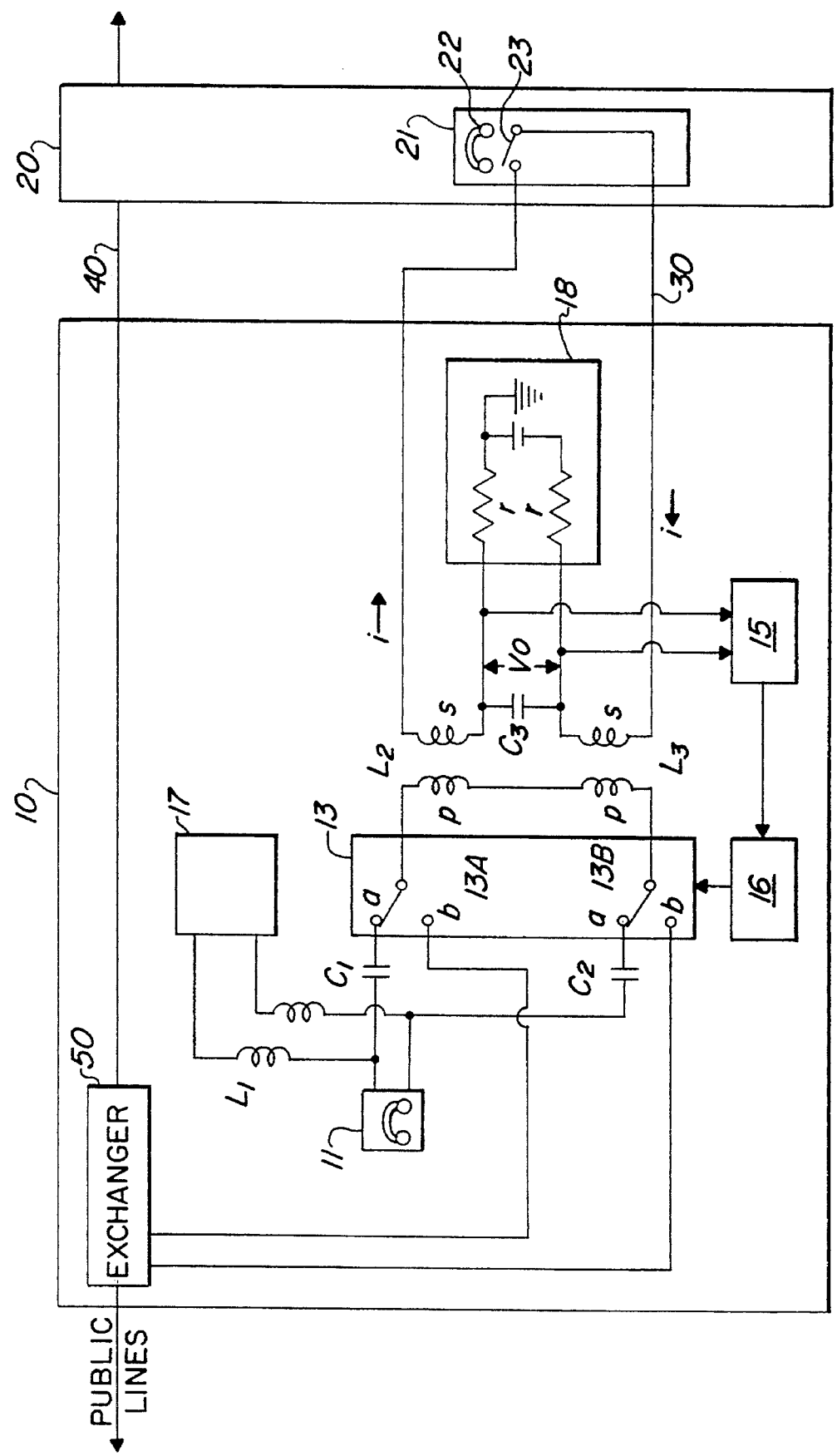

Referring to FIG. 1 a preferred embodiment of the present invention is hereinafter described in detail.

A repeater station 20, which may be referred to as an independent station, is connected via a trunk 40, i.e. a plurality of telephone lines, with an exchanger 50 installed in a switching station 10, which may be referred to as a master station. The trunk 40 may be a bunch of copper wires or a multiplexed transmission line. A first telephone terminal 11 installed in switching station 10 is connected via a pair of telephone lines 30, that is an order wire, with a second telephone terminal 21 in repeater station 20. The telephone lines 30 of the order wire may be a speech path in the bunch. The order wire may also be a pair of copper wires provided additionally to the transmission line. There are provided capacitors C1 and C2, a switch circuit 13 and coils L2 in switching station, between the first telephone terminal 11 and the telephone lines 30. Capacitors C1 and C2 allow a speech/tone signal to pass therethrough but stop a DC (direct current) current supplied from a battery feed 17. Coils L2 also allow speech signal to pass therethrough but prevent a DC (direct current) supplied from another battery feed 18 from flowing into switch circuit 13. Capacitor C3 effectively connects speech/tone signal between the secondary windings "s" of coils L2 and L3.

Switch circuit 13 includes two transfer switches 13A and 13B. Each transfer switch is on position "a" so as to connect primary windings "p" of coils L2/L3 via capacitors C1/C2 to first telephone terminal 11 on a usual order wire communication between the two stations for, such as, line-up or maintenance operation in the stations. Battery feed 17 supplies the DC voltage via coils L1 to first telephone terminal 11.

Another battery feed 18 includes a battery typically of 48 V DC and two resistors "r", of for example 200Ω, in series to output terminals of the battery, respectively. Battery feed 18 supplies the DC voltage via secondary windings "s" of coils L2 and L3 to second telephone terminal 21. When a telephone handset 22 of second telephone terminal 21 is picked up in order to place a call, in other words when second telephone terminal 21 is hooked off, a loop is established by a hook switch 23 provided in second telephone terminal 21 via handset 22, secondary winding "s" of coils L2/L3, telephone lines 30 and battery feed 18. Thus, a loop current "i" in the range of 20 to 40 mA flows through the loop.

Figure 2:
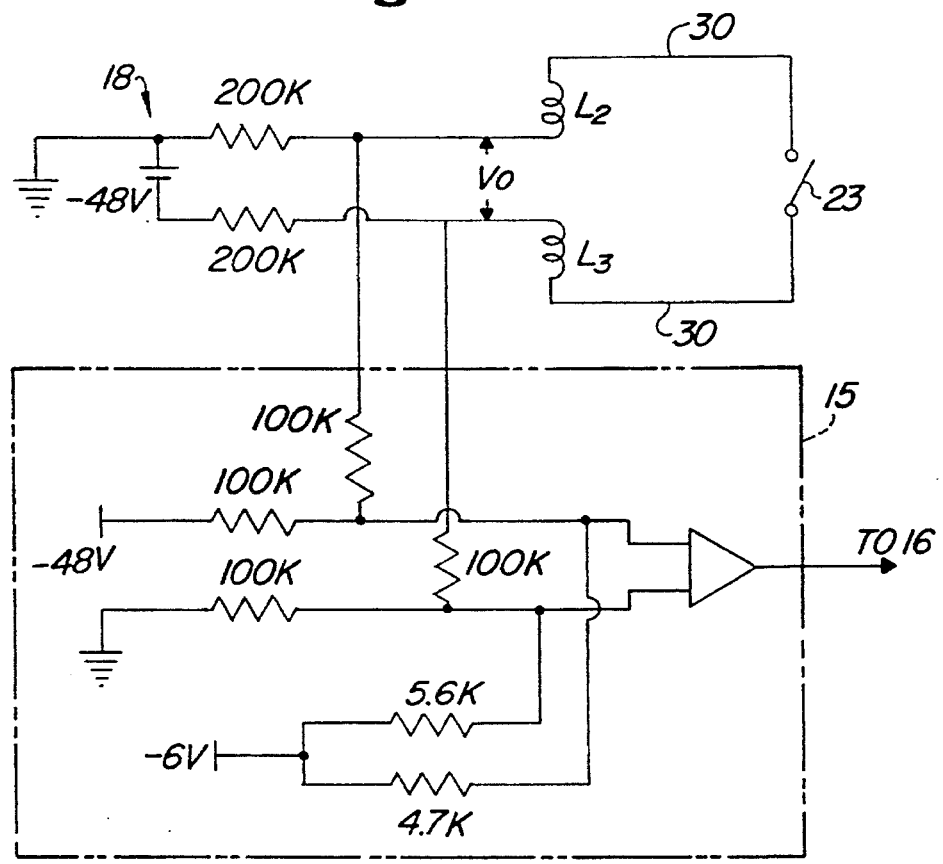
FIG. 2 illustrates a typical circuit configuration of the on/off hook state detection circuit.

An on/off-hook state detection circuit 15 watches voltage Vo output via 200Ω resistors "r" from battery feed 18. The output voltage Vo is lowered by the loop current flowing through the resistors "r". As shown in FIG. 2, on/off-hook state detection circuit 15 is formed of a comparator and resistors, where the threshold level of the comparator is set at, for example 14 mA of the loop current. Thus, on/off-hook state detection circuit 15 determines an on-hook state when the loop current is lower than 14 mA, so as to output logical level L, as well as an off-hook state when the loop current is larger than 14 mA so as to output logical level H.

The output of on/off-hook state detection circuit 15 is input to a hooking state discrimination circuit 16. Typical circuit configuration of hooking state discrimination circuit 16 is schematically shown in FIG. 3.

If the call from second telephone terminal 21 is intended to call first telephone terminal 11, handset 22 of second telephone terminal 21 is just picked up. Then, the output of 16 keeps L as shown in FIG. 4(a) so as to keep switches 13A and 13B to rest on position "a" connected to exchanger 50. In FIGS. 4, To indicates the moment the handset 22 is picked up, as well as T4 indicates the moment the handset 22 is returned.

If the call from second telephone terminal is intended to call a person outside the switching station who can be reached through a public line, the person who picked up handset 21 is required to momentarily push hook switch 23 of second telephone terminal 21 so as to momentarily break the hook switch 23, in other words a generally-called hooking operation is carried out. In this hooking operation it is discriminated by the hooking state discrimination circuit 16 whether the hooking operation satisfies a specific hooking condition. The hooking operation can be acknowledged as an authorized hooking operation only when the momentary on-hook period L detected by 15 is shorter than a specific period, for example, 1 second and terminates before a specific time $T_1$, which is, for example, 2 seconds after the initiation of the first off-hook operation, i.e. the moment $T_0$ when the handset is picked up. Thus, upon acknowledging the specific hooking operation the hooking operation discriminating circuit 16 outputs a logical level H.

Figure 3:
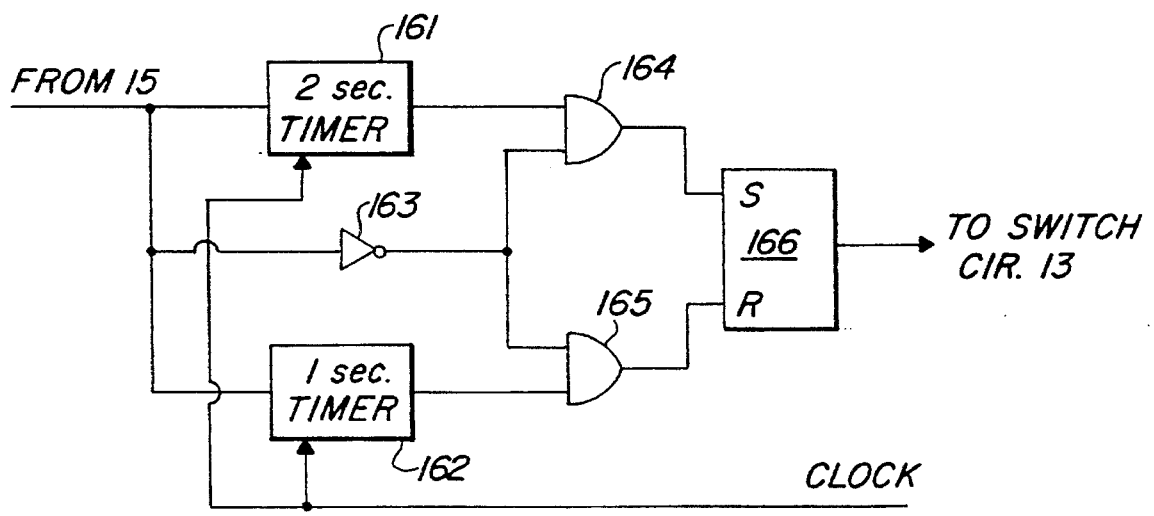
FIG. 3 illustrates a typical circuit configuration of an hooking operation discrimination circuit.

Referring now to FIG. 3, the output signal of 15 is input to a first timer 161, a second timer 162 and an inverter 163, each of 16. First timer 161 is initiated to count clock pulses input thereto by a first rising edge (at $T_0$) of the input signal thereto. Second timer 161 is initiated to count clock pulses input thereto by a first falling edge (at $T_1$) of the input signal hereto. Timers 161 and 162 are such that a logical H level is output only when the counter is counting the clock pulses, and the counting operation terminates upon counting up the period preset in the counter. Outputs of first timer 161 and inverter 163 are input to a first AND gate 164, whose output is input to a set terminal S of a latch 166. Outputs of second timer 162 and inverter 163 are input to a second AND gate 165, whose output is input to a reset terminal R of latch 166. Latch 166 is such that when a H level is input to both of S and R terminals the R terminal dominates over the S terminal.

FIG. 4(b) shows the case where the on-hook state satisfies the above-specified hooking condition, accordingly latch 106 outputs H level. FIG. 4(c) shows the case where the duration of the on-hook state is longer than its specified hooking period, i.e. 1 second. Accordingly, latch 106 continues to output L level. FIG. 4(d) shows the case where the on-hook period L continues even after the specified time limit $T_2$. Accordingly, latch 106 continues to output L level. When the talk on the order wire is finished and the handset of the second telephone terminal 21 is returned to the on-hook state, the output of 16 becomes L so that switches 13A and 13B return to the position "b". When the handset of the second telephone terminal 21 is returned to the on-hook state without accomplishing the specific hooking operation, the output of 16 keeps on level L so that switches 13A and 13B rest on the position "b".

Thus, when the hooking operation is dully acknowledged the second telephone terminal 21 is connected with exchanger 50, through which second telephone terminal 21 can place a call to any one on the public lines.

It is apparent that the specific hooking condition preset in 16 to allow the actuation of switch circuit 13 may be arbitrarily chosen other than the above-referred condition according to the design choice of the system.

Though in the preferred embodiment the counters are employed to scale the specified times, it is apparent that any other devices, such as a mono-stable multi-vibrater, can be employed therefor.

Though in the preferred embodiment the pair of telephone lines 30 are switched to the exchanger, it is appraent the lines may be switched directly to a particular pair of public lines without being processed by the exchanger.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications are equivalents may be resorted to, falling within the scope of the invention as defined in the appended claims.

What is claimed is:

1. An order wire circuit, installed in addition to a trunk connecting a master station and a dependent station in a telephone system, comprising:

a first telephone terminal located in the master station;

a second telephone terminal located in the dependent station;

a telephone line connecting said first and second telephone terminals;

hooking detection means installed in said master station, for specifically detecting a hook state operation initiated in the dependent station by an operator of said second telephone terminal;

switching means for switching said telephone line from said first telephone terminal to a public line when said hook state operation initiated in the dependent station by an operator, is specifically detected.

2. An order wire circuit as recited in claim 1, wherein said hook state operation is specifically detected when an on-hook state of said second telephone terminal after a first off-hook state thereof is shorter than a first predetermined period and said first predetermined period terminates within a second predetermined period measured after said first off-hook state of said second telephone terminal begins.

3. An order wire circuit, installed in addition to a trunk connecting a master station and a dependent station in a telephone system, comprising:

a first telephone terminal located in the master station;

a second telephone terminal located in the dependent station;

a telephone line connecting said first and second telephone terminals;

hooking detection means for detecting whether or not said second telephone terminal is off or on hook, said hooking detection means including, a first timer for timing an on hook state occurring after a first off hook state begins until a second off-hook state occurs, and producing a first output when said on hook state lasts no longer than a predetermined first period;

a second timer for producing a second output for a predetermined second period following detection of said initial off hook state of said second telephone terminal; and specific hooking operation detecting means for outputting a specific hooking signal when said first output is produced at the same time as said second output; and switching means for switching said telephone line from said first telephone terminal to a public line when said specific hooking operation detection means outputs said specific hooking signal.

* * * * *